Sept. 11, 1934.  W. G. JOHNSON  1,973,080
METHOD OF IMPREGNATING CONDUITS
Filed Dec. 19, 1930  3 Sheets-Sheet 1
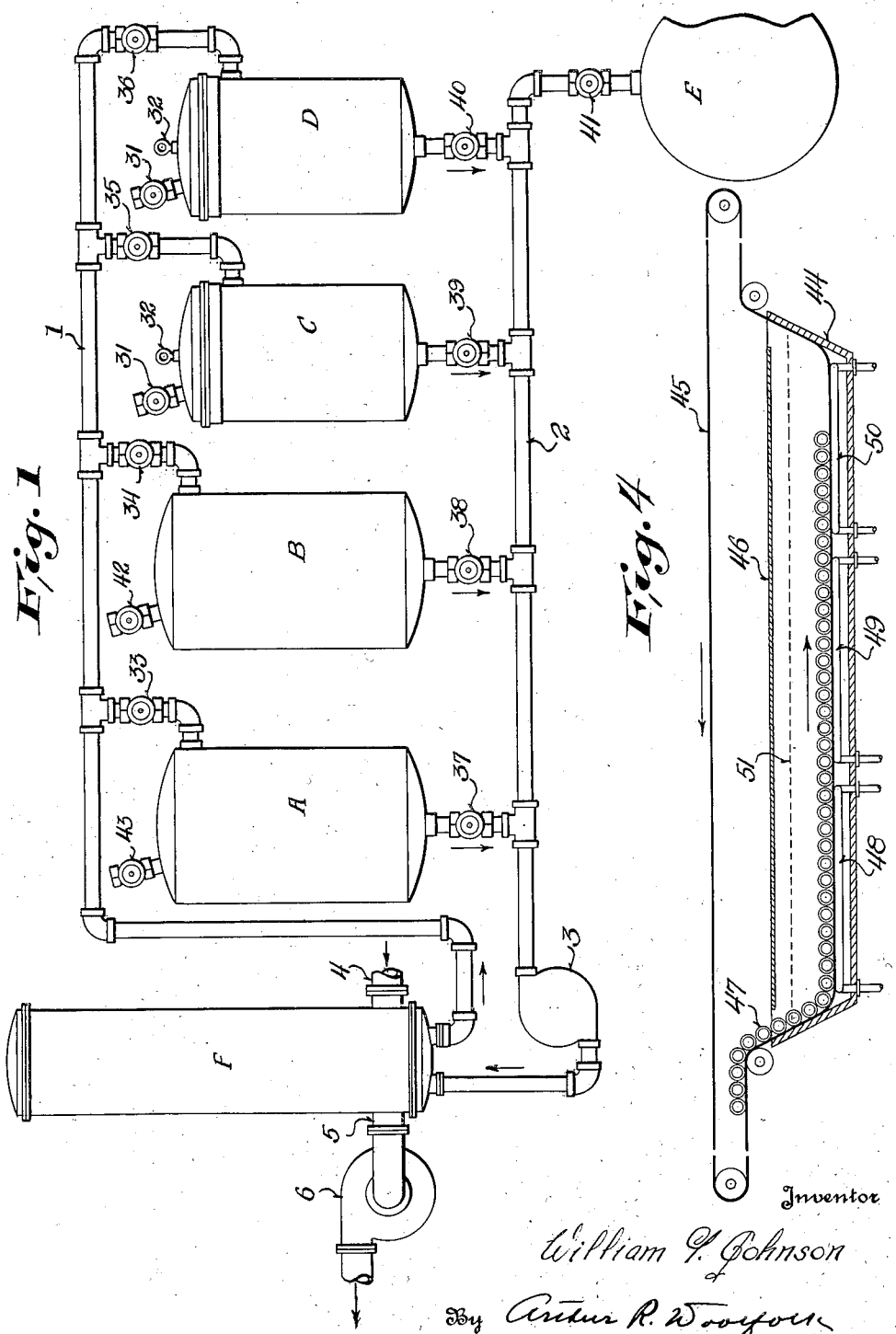
Inventor
William G. Johnson
By Arthur R. Woofork
Attorney Sept. 11, 1934. W. G. JOHNSON 1,973,080
METHOD OF IMPREGNATING CONDUITS
Filed Dec. 19, 1930 3 Sheets-Sheet 2
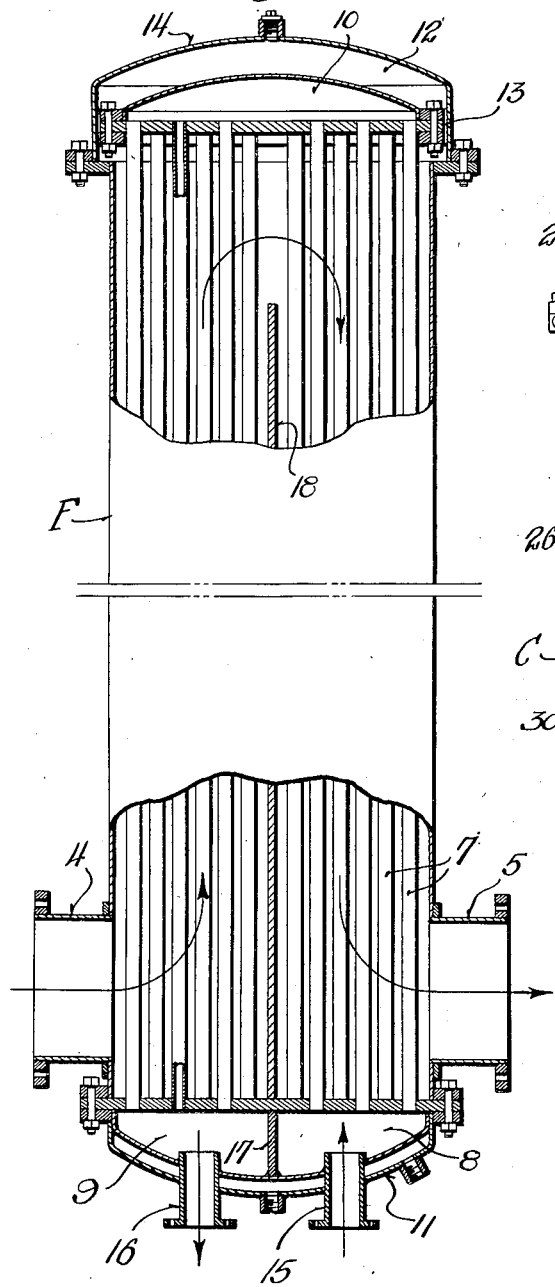
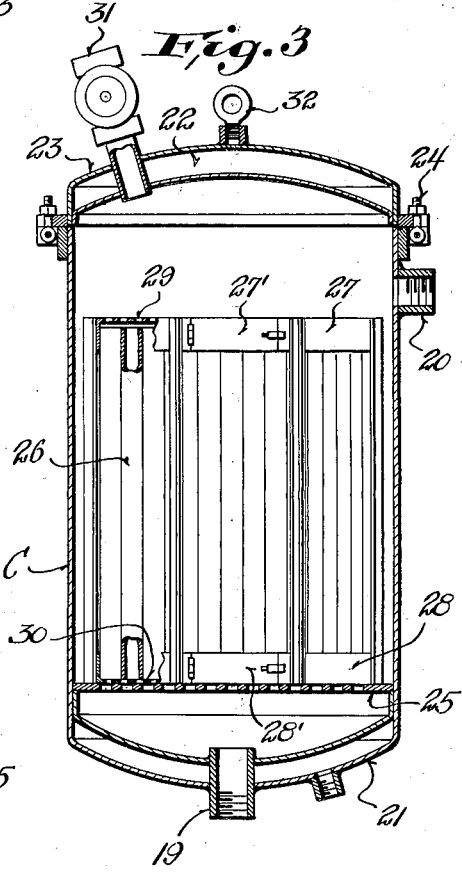
Inventor
William G. Johnson
By Arthur R. Woolford
Attorney Sept. 11, 1934.  W. G. JOHNSON  1,973,080
METHOD OF IMPREGNATING CONDUITS
Filed Dec. 19, 1930  3 Sheets-Sheet 3

Inventor
William G. Johnson
By Arthur R. Woolford
Attorney

Patented Sept. 11, 1934

1,973,080

UNITED STATES PATENT OFFICE 1,973,080

METHOD OF IMPREGNATING CONDUITS

William G. Johnson, Milwaukee, Wis., assignor to Line Material Company, South Milwaukee, Wis., a corporation of Delaware Application December 19, 1930, Serial No. 503,485

4 Claims. (Cl. 99—12)

This invention relates to a method of impregnating conduits, such, for instance, as the conduits used for electric conductors.

In impregnating conduits with a suitable impregnating substance, such, for instance, as coal tar pitch, water gas tar pitch or asphaltum tar pitch, or other suitable material which, for brevity but in no limiting sense, will be referred to as the impregnating liquid, various difficulties have been encountered.

When the conduits were impregnated with a substance having a low melting point, or which remained fluid at moderate temperatures, it was found that the material oozed out of the finished conduit or was slowly exuded by the conduit, so that the conduit remained sticky and was not wholly satisfactory in use. In addition to this, the mechanical strength of such impregnated conduits was low.

On the other hand, when it is was attempted to impregnate the conduits by subjecting them to a material which had a higher melting point, or in other words, impregnating the conduits at a higher temperature, charring of the conduits resulted, with consequent loss of dielectric properties and mechanical strength.

If it is attempted to impregnate the conduits at lower temperatures with a material which has a somewhat high melting point, it has been found that the material cannot be drained fully from the conduits, but that adhering knots, projections or globules remain which render the conduits unsatisfactory.

This invention is designed to overcome the defects noted above, and objects of this invention are to provide a novel method of impregnating conduits which permits the use of a material that requires a fairly high temperature for impregnation, but which does not result in charring or otherwise injuring the conduits by weakening or lessening either their mechanical strength or their electrical insulating properties.

Further objects are to provide a process of impregnating conduits which avoids the sticky type of finished conduit on the one hand, and which avoids the formation of knobs, globules, or projections of the impregnating material on the other hand, so that a finished conduit results which is not sticky, is not rough, due to adhering matter, and which is mechanically strong, and has high electrical insulating properties.

Further objects are to provide a process which is simple to follow, which is rapid, which allows a substantially continuous operation, and which is economical.

The process may be carried out with any one of several different forms of apparatus, a few of which are shown, more or less diagrammatically in the accompanying drawings, in which:—

Figure 1 is a view showing one form of apparatus for carrying out the process.

Figure 2 is an enlarged view, partly in section, of the heater.

Figure 3 is an enlarged sectional view, partly broken away, of one of the impregnating tanks, such view showing a crate of tubes in place.

Figure 4 is a view of a modified form of apparatus showing a continuous conveyor for carrying the conduits either singly, as shown, or in crates, as will appear as the description proceeds.

Figure 5:
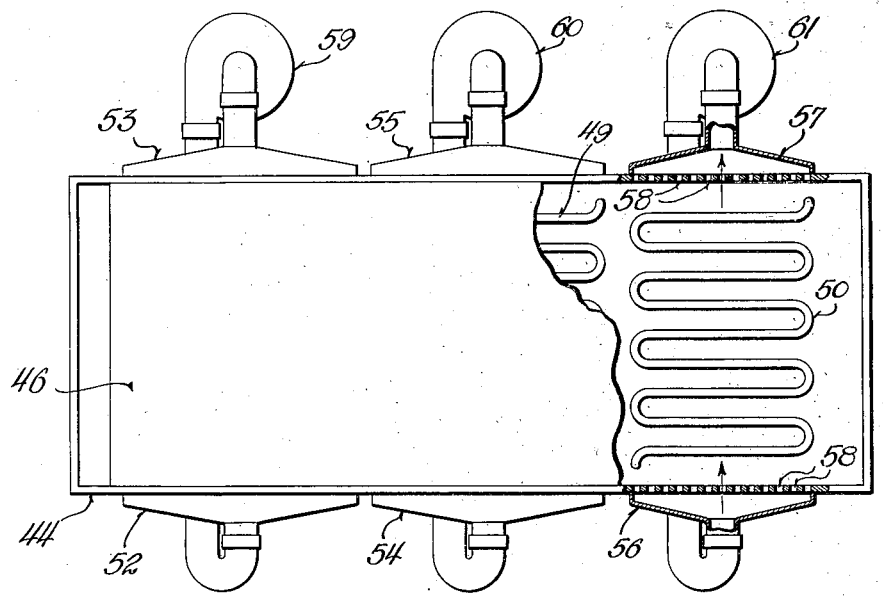
Figure 5 is a plan view of the vat, the conveyor being omitted for clearness, such view being partly in section.

The process, forming the subject matter of this invention, consists, briefly stated, in subjecting the conduits to the action of an impregnating material such as coal tar pitch, water gas tar pitch, asphaltum tar pitch, or other suitable material, at a given temperature and for a predetermined length of time. The temperature at which this impregnating material is used is below the charring temperature of the conduits. In actual practice it has been found that a period of four hours at a temperature approximating 300 degrees F. is satisfactory, although it is to be distinctly understood that other temperatures and other periods of time may be employed without departing from the spirit of the invention.

After the conduits have been so treated and have become thoroughly impregnated, it has been found that if the impregnating material is of a constituency such as to insure a satisfactory final impregnated conduit, that if the process were stopped at this point, globules, knobs, or projecting portions of the impregnating material will adhere to the surface of the conduits and render them unsatisfactory. Therefore, this process contemplates the further step of washing the impregnated conduits with a liquid, preferably an impregnating material, at a temperature sufficient to melt off any adhering particles, as described above, and yet without charring the conduits. This is secured by subjecting the impregnated conduits to a rapid washing action by circulating around and through the conduits an impregnating material which may be at a temperature above the charring temperature of the conduits, but terminating this step in the process in a very short time.

As a specific example, it has been found that a temperature approximating 350 degrees F. and for a period of approximately thirty minutes is satisfactory. This specific illustration of the temperature and time for this stage of the process is not intended as limiting, and is merely given as an illustration of the approximate conditions that have been found thoroughly satisfactory. A variation either in time or temperature in either of these two steps of the process can occur without seriously injuring the final product.

It is also preferable to allow a lapse of approximately fifteen minutes between the two steps in the process to thereby permit the impregnated conduits to drain to a certain extent. This intermediate step, however, is not wholly necessary.

Referring now to Figures 1, 2 and 3, where one form of apparatus suitable for carrying out the process has been disclosed, it will be seen that two storage tanks A and B have been provided, and as shown in Figure 1, two treating tanks or impregnating tanks C and D may be employed. In the actual practice of this invention a larger number of impregnating tanks are employed for the reason that a greater capacity of the apparatus is thereby produced. It is thought, however, sufficient to illustrate a plurality of impregnating tanks, as shown in Figure 1.

The apparatus also comprises a charging tank E which may be at any height above or below the rest of the apparatus, or may be on the same level, Figure 1 being merely a diagrammatic showing. A heater F is also employed and, as shown in Figure 1, it is connected to the upper portion of each of the tanks A, B, C and D by means of an upper header 1, and to the lower portion of each of these tanks and to the charging tank E by a lower header 2. A pump 3 is positioned preferably between the lower header 2 and the heater F, although obviously it could be placed at some other portion of the system.

The heater may be heated by any suitable means, a very economical means being flue gas. The flue gas may enter as indicated at 4 and may leave as indicated at 5, such flue gas being rapidly drawn through the heater by means of the blower 6. The details of one form of the heater are shown in Figure 2, and one form of the impregnating tanks is shown in Figure 3, Figure 1 it being understood is merely diagrammatic.

Referring in greater detail to the heater F as illustrated in Figure 2, it will be seen that such heater comprises a plurality of vertical tubes or pipes 7 which open into a pair of lower cavities 8 and 9 formed in a steam jacketed base, and into an upper cavity 10. The steam jacket is indicated by the reference character 11 in Figure 2. If desired, a space 12 may be left above the upper drum which forms the cavity 10, and this space may communicate with the space within the main cylindrical portion of the heater by means of a small passageway 13, as indicated in Figure 2, or by merely making a loose fit between the upper head 14 of the heater and the upper portion of the interior structure.

The impregnating material enters through the fitting 15 and leaves by way of the fitting 16, a baffle plate 17 being employed to separate the cavities 8 and 9. The impregnating material thus travels upwardly through the right half of the banked pipes, as viewed in Figure 2, and downwardly through the left banked pipes, as shown in such figure. The flue gases enter as indicated at 4 and leave as indicated at 5, as previously described in connection with Figure 1, Figure 2 being taken from the reverse side of that shown in Figure 1.

It is thus apparent that a counter-directional flow is obtained between the flue gas and the impregnating material, and thus an efficient interchange of heat is secured. To emphasize this counter-directional flow and to insure the complete heating of substantially the entire surface of the pipe 7, it is preferable to employ a centrally located baffle plate 18 for directing the flue gas within the heater, such baffle plate terminating short of the upper end of the heater, as shown in Figure 2.

The impregnating tanks C and D are of identical construction. One of the tanks, for instance tank C, is shown in detail in Figure 3. This impregnating tank is provided with an outlet fitting 19 and an inlet fitting 20 for the impregnating liquid. The tank is also preferably provided with a lower steam jacket 21 and an upper insulating air jacket 22. The cap indicated by the reference character 23 is readily removable from the remainder of the tank to thus provide access to such tank. This cover may be temporarily locked in place by means of the wing bolts 24, or in any other suitable way.

Within the tank a perforated false bottom 25 is provided upon which the conduits 26 may rest. The conduits are preferably held in small crates which may consist of an upper band 27 and a lower band 28, a perforated upper plate 29 and a perforated lower plate 30 being provided. It is also preferable to provide small doors 27' and 28' in the upper and lower bands to thus facilitate the insertion and removal of the conduits when the crates are removed from the tanks.

It is preferable to provide each of the impregnating tanks with a vent valve 31, which may be opened or closed as needed in the process in the manner hereinafter to appear. It is also preferable to equip the caps 23 with eyelets 32 so that the caps may be readily removed by means of a crane.

Inlet valves 33, 34, 35 and 36 control communication of the upper header 1 with the upper portion of each of the tanks A, B and C, it being noted that the inlet portion 20 of the tanks C and D, as shown in Figure 3, is above the upper perforated plate 29 of the crates so that the incoming impregnating liquid will spread substantially evenly over the upper portion of the crates.

Valves 37, 38, 39 and 40 control communication between the lower portion of each of the tanks A, B, C and D and the lower header 2. It is also preferable to provide a valve 41 between the charging tank E and the lower header 2.

Assuming that the storage tanks A and B are filled with impregnating material and the pump is in operation, the valves 33 and 37 are opened and impregnating material in the storage tank A is raised to a predetermined temperature, for example in the specific illustration chosen, approximately 350 degrees F. This is secured by circulating the impregnating material through the heater and into the tank A for the desired length of time. Subsequently the valves 33 and 37 are closed and the valves 34 and 38 are opened, and the impregnating material in the tank B is circulated rapidly through the heater F until its temperature is raised to a lower degree than that of the tank A, for example 300 degrees F., as indicated in the specific illustration chosen. The valves 34 and 38 are now closed.

The tanks C and D are now opened and a crate of conduits placed in each tank. Thereafter, the tank C is filled by opening the valves 35 and 38 and the vent valve 31 of the tank C. The storage tanks A and B are also provided with vent valves 42 and 43, as shown in Figure 1, and the vent valve 42 of the tank B may be opened to allow entrance of air. Consequently, impregnating material of the temperature of the tank B is withdrawn from the bottom of the tank by the pump 3 and passed quickly through the heater and discharged into the tank C, until the tank C is filled to a point above the upper ends of the conduits. Thereafter the valve 35 is closed and the valve 36 opened. The pump now delivers impregnating material from the tank B into the tank D until the tank D is charged, as described for the tank C.

The conduits are allowed to remain in the impregnating material for approximately four hours, a longer or shorter time being, of course, within the spirit of this invention.

After the requisite length of time has elapsed, the impregnating material from one of the tanks C or D, for instance tank C, is withdrawn by the pump 3 by opening the valve 39 and the valve 34 and returned to the storage tank B. The conduits are allowed to drain for a short time if desired. In the specific example chosen, this draining period may occupy fifteen minutes, although obviously the time may be varied.

Subsequently the valves 39 and 34 are closed, and the valves 37 and 35 and 43 are opened, and the impregnating material at a higher temperature is withdrawn from the tank A and discharged into the tank C. The valve 37 may now be closed, and the valve 39 opened, and thus impregnating material at the higher temperature may be rapidly circulated through the tank C to thus thoroughly wash the impregnated conduits of any adhering impregnating material. This washing process may be continued for a short time, for example as in the specific illustration chosen, thirty minutes has been found satisfactory.

After this washing, the valve 35 is closed and the valve 33 opened, and the impregnating material withdrawn from the tank C and discharged into the tank A. Subsequently these valves are closed. A similar operation is followed for the tank D and for as many more of the impregnating tanks as the apparatus may have. It is to be understood, of course, that any number of impregnating tanks may be employed so that a substantially continuous operation takes place.

After the conduits have drained they are removed from the impregnating tanks by removing the covers and lifting the crates of conduits from the tanks. It is obvious that if at any time the temperature of the storage tanks A and B should drop, that the impregnating material may be easily brought back to the desired temperature by opening the appropriate valves and circulating such material through the heater.

It is clear that either or both the impregnating process or the washing process may be carried on under any pressure desired or at atmospheric pressure by suitably operating the valves and operating the pump to build up the desired pressure in any portion of the apparatus.

It is obvious that a small amount of the impregnating material is lost after each operation and consequently, from time to time the valve 41 is opened and the supply of impregnating material is replenished by withdrawing it from the tank E and pumping it into the appropriate storage tank A or B as desired.

It is clear that during the initial filling of the impregnating tanks that the tops or covers may remain off so that the height of the liquid may be observed. Obviously, indicating means could be employed if so desired.

It is to be distinctly understood that the impregnating material withdrawn from the tank B is below the charring temperature of the conduits or other fiber insulating material that may be employed, and consequently, a prolonged soaking or treatment with this impregnating material may take place without damage to the conduits. The impregnating material from the tank A is preferably slightly above the charring temperature of the conduits. In the specific illustration chosen, it has been found that the conduits frequently char at approximately 330 degrees F. However, charring of the conduits is prevented due to the fact that the action of this higher temperature liquid is permitted for only a very brief or limited time. Further, this higher temperature liquid is rapidly circulated through and around the conduits to thoroughly wash the conduits. It is then completely withdrawn from the conduits so that no charring can result. The conduits are, therefore, not weakened mechanically, nor is their electric insulating characteristic lowered.

While conduits have been shown as the specific article operated upon by this process, it is nevertheless to be understood that the invention in its broadest aspects is not limited solely to conduits, but may be employed for other fiber insulating articles, or other similar articles.

It is clear that other forms of apparatus could be employed for carrying out this process. For instance, as diagrammatically shown in Figure 4, a vat 44 for the impregnating material may be provided, and a continuous conveyer 45 may have one stretch or portion thereof passing down and through the vat. If desired, an upper cover plate 46 may be provided which extends into proximity to the ends of the vat. The conduits 47 may be loaded on the conveyer at one end and may be removed therefrom at the other, the conveyer running continuously. Further, steam coils 48, 49 and 50 may be provided at successively spaced positions along the elongated vat. The impregnating material may fill the vat to the level indicated by the dotted line 51. The steam coils are preferably maintained at different temperatures, for instance the coil 48 may be at the lowest temperature, and the coil 50 at the highest temperature, a range of temperatures somewhat as described in connection with Figure 1 being employed. Means are provided for rapidly transversely circulating the impregnating material adjacent each of the banks of coil, as shown in Figure 5. For example, pairs of headers 52, 53, 54 and 55, 56 and 57 may be provided on opposite sides of the vat 44, and these headers may communicate with the interior of the vat by means of perforations 58. Pumps 59, 60 and 61 may be respectively connected to opposite headers, as shown in Figure 5, so that a rapid circulation of the impregnating fluid transversely of the vat is obtained.

It is to be noted in connection with Figure 5 that the conveyer has been omitted for the sake of clearness. It is obvious that the conduits could be fed to the conveyer either singly or in groups contained in crates, for instance as previously described.

Figure 6:
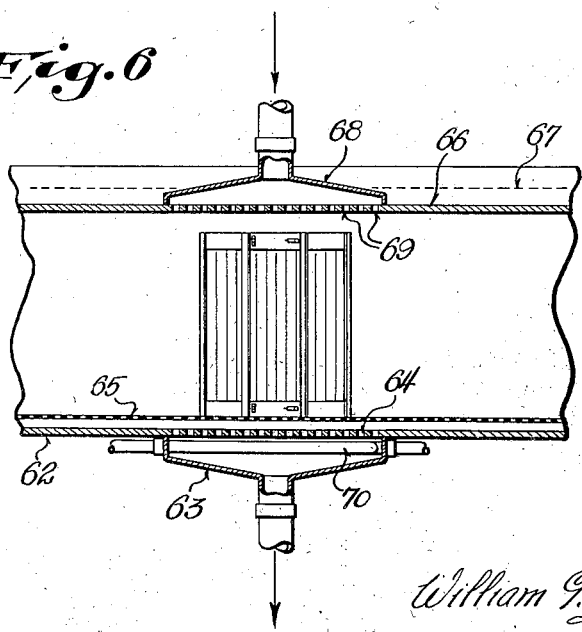
Figure 6 is a view of a further modification, such view being in section and showing a fragment of a vat and a portion of the lower stretch or portion of a conveyor with a crate of conduits in place.

It is also obvious that the conduits could stand vertically instead of being carried by the conveyer horizontally. An apparatus suitable for carrying the conduits in this manner is shown in Figure 6. A fragment of the vat is indicated by the reference character 62, and one of the lower headers at 63. This lower header communicates with the bottom portion of the vat by means of apertures 64, it being noted also that the conveyer 65 is also apertured. The vat is provided with an upper plate 66 which is slightly below the level of the impregnating material, as indicated by the dotted line 67, the plate 66 being lower than the end and side walls of the vat, as shown in Figure 6. Immediately above the lower header 63 an upper header 68 is provided and communicates with the interior of the vat by means of apertures 69 formed in the plate 66. Heating coils 70 may be positioned within one or the other of each pair of headers, for instance as shown in Figure 6, a heating coil is located in the lower header 63. Pumps similar to those employed in Figure 5 connect to the headers 63 and 68.

It will be seen that a very effective process of impregnating conduits has been provided by this invention which obviates the difficulties heretofore encountered in impregnating conduits, and which provides a finished impregnated conduit, which has high electrical insulating characteristics, which is free from any charred portions, which is mechanically strong, and which has been treated with an impregnating material that will not ooze out in the normal use of the conduits.

It will also be seen that the process avoids the formation of globules, knobs or projections of the impregnating material, but secures a smooth and finished product.

Although this invention has been described in considerable detail, it is to be understood that such description is intended as illustrative rather than limiting, as the invention may be variously embodied and is to be interpreted as claimed.

I claim:

1. The process of impregnating conduits with a meltable impregnating material which on cooling leaves adhering knots, projections or globules, said process comprising subjecting the conduits to a bath of impregnating material at a temperature below charring of the conduits, and subsequently quickly washing the conduits with a liquid at a temperature at least sufficient to cause charring of the conduits if a prolonged exposure of the conduits to the liquid were permitted.

2. The process of impregnating conduits with a meltable impregnating material which on cooling leaves adhering knots, projections or globules, said process comprising subjecting the conduits to the action of an impregnating liquid at a temperature below that required to produce charring of the conduits, and subsequently subjecting the conduits to the action of an impregnating liquid at a temperature above the charring temperature of the conduits for a length of time insufficient to produce charring of the conduits and causing relative motion between the conduits and the last mentioned liquid to produce a washing action to wash off adhering projections formed of impregnating material.

3. The process of impregnating conduits with a meltable impregnating material which on cooling leaves adhering knots, projections or globules, said process comprising subjecting the conduits to a bath of impregnating material for a predetermined time and at a temperature below the charring temperature of the conduits, and subsequently washing the conduits by a rapidly flowing impregnating material at a temperature above that required to produce charring of the conduits for a length of time insufficient to produce charring of the conduits.

4. The process of impregnating fibrous articles with a meltable impregnating material which on cooling leaves adhering knots, projections, or globules, said process comprising subjecting the articles to the action of a bath of impregnating material of a predetermined temperature below the charring temperature of the said articles, and subsequently subjecting the articles to a quick washing bath in a liquid at a temperature sufficient to cause charring of the articles if carried on for a prolonged period, said temperature being sufficient to quickly remove the adhering material from the surface of the articles and the period in the washing bath being sufficiently short to prevent damage to the fibrous articles or removal of the material actually impregnating the articles.

WILLIAM G. JOHNSON.